(12) United States Patent
Sandell et al.

(10) Patent No.: US 11,511,814 B2
(45) Date of Patent: Nov. 29, 2022

(54) MOUNTING SYSTEM FOR VEHICLE ACCESSIBILITY APPARATUS

(71) Applicant: BraunAbility Europe AB, Stenkullen (SE)

(72) Inventors: Mathias Sandell, Lerum (SE); Joakim Bergstrand, Gråbo (SE)

(73) Assignee: BRAUNABILITY EUROPE AB, Stenkullen (SE)

( * ) Notice: Subject to any disclaimer, the term of this patent is extended or adjusted under 35 U.S.C. 154(b) by 221 days.

(21) Appl. No.: 17/086,931

(22) Filed: Nov. 2, 2020

(65) Prior Publication Data
US 2021/0147004 A1 May 20, 2021

(30) Foreign Application Priority Data

Nov. 19, 2019 (GB) .................................... 1916837

(51) Int. Cl.
| | |
|---|---|
| *B62D 25/20* | (2006.01) |
| *A61G 3/06* | (2006.01) |
| *B62D 21/02* | (2006.01) |
| *B62D 27/02* | (2006.01) |
| *B62D 31/00* | (2006.01) |

(52) U.S. Cl.
CPC ......... *B62D 25/2009* (2013.01); *A61G 3/062* (2013.01); *B62D 21/02* (2013.01); *B62D 27/02* (2013.01); *B62D 31/00* (2013.01)

(58) Field of Classification Search
CPC .... B62D 25/2009; B62D 21/02; B62D 27/02; B62D 31/00; A61G 3/062
See application file for complete search history.

(56) References Cited

U.S. PATENT DOCUMENTS

| | | | |
|---|---|---|---|
| 6,379,102 B1 | 4/2002 | Kameda | |
| 6,726,435 B1 * | 4/2004 | Williams | B60P 1/4442 |
| | | | 414/560 |
| 8,104,814 B2 * | 1/2012 | Sartin | A61G 3/0816 |
| | | | 296/19 |
| 10,533,374 B2 * | 1/2020 | Jevaney | E06C 5/36 |
| 2004/0080172 A1 | 4/2004 | Mitchell et al. | |
| 2005/0186056 A1 | 8/2005 | Logan | |

FOREIGN PATENT DOCUMENTS

| | | |
|---|---|---|
| DE | 2533008 A1 | 1/1977 |
| EP | 2818148 A1 | 12/2014 |
| EP | 2821045 A1 | 1/2015 |

OTHER PUBLICATIONS

Search Report, UKIPO, GB1916837.6, dated Mar. 23, 2020, 3 pages.
European Patent Office; European Search Report; dated Apr. 7, 2021; pp. 1-5.

* cited by examiner

*Primary Examiner* — Lori L Lyjak
(74) *Attorney, Agent, or Firm* — Taft Stettinius & Hollister LLP; Stephen F. Rost (57) ABSTRACT

A mounting system for securing a base plate of an access device within a vehicle includes a plurality of lateral clamping beams configured for attachment to a tracked floor in an orientation in which each of the plurality of lateral clamping beams lies across a plurality of tracks in the tracked floor. The plurality of lateral clamping beams includes a front lateral clamping beam adapted to overlie a front edge of the base plate, and a rear lateral clamping beam adapted to overlie a rear edge of the base plate.

15 Claims, 10 Drawing Sheets

MOUNTING SYSTEM FOR VEHICLE ACCESSIBILITY APPARATUS

RELATED APPLICATIONS

The present application claims priority to GB 1916837.6, filed Nov. 19, 2019, the disclosure of which is hereby incorporated by reference in its entirety.

FIELD OF THE INVENTION

The invention relates to a mounting system for use in a wheelchair accessible vehicle, e.g., to secure an access device such as a lift or a ramp. In particular, the invention relates to a mounting system for securing a passenger wheelchair elevator or foldable ramp (e.g. tailboard ramp) in a vehicle, e.g. at the back door of a minibus or the like.

BACKGROUND TO THE INVENTION

It is known to adapt vehicles such as minibuses or transit vehicle to provide transport for wheelchair users. Typically, there is a large step up from the ground to the floor of the vehicle supported by the chassis. To improve accessibility, it is common to mount a fold-out wheelchair elevator (or wheelchair lift) or ramp within the vehicle. An example of a known wheelchair elevator is the BraunAbility E-series. An example of a fold-out tailboard ramp is the BraunAbility BGR 90-21P product.

Conventionally, wheelchair elevators or fold-out ramps have a base plate that is secured to the chassis of the vehicle. It is important for this attachment to be robust, as it must support the full weight of the load lifted by the elevator or supported by the ramp. The base plate is manufactured with attachment features, e.g. bolt holes or the like, in a specific configuration to fix to a certain type of vehicle.

SUMMARY OF THE INVENTION

At its most general, the invention provides a mounting system that is arranged to fix a base of an access device (e.g. wheelchair elevator or fold-out ramp) on to a tracked floor provided within a vehicle. The mounting system operates to secure the base to the tracked floor using laterally extending clamping beams that overlie the front and rear edges of the base. The clamping beams may be adapted to fit to a variety of tracked floor configurations, e.g. through suitable spacing and shaping of through holes for receiving connection bolts. The mounting system may be capable of mounting different types of access device without requiring the base to be provided with bespoke attachment features. Moreover, the mounting system enables access devices to be securely mounted in vehicles without requiring the access device itself to be directly secured to the vehicle frame (e.g. chassis).

According to one aspect of the invention, there is provided a mounting system for securing a base plate of an access device within a vehicle, the mounting system comprising: a plurality of lateral clamping beams configured for attachment to a tracked floor in an orientation in which each of the plurality of lateral clamping beams lies across a plurality of tracks in the tracked floor, wherein the plurality of lateral clamping beams comprises a front lateral clamping beam adapted to overlie a front edge of the base plate, and a rear lateral clamping beam adapted to overlie a rear edge of the base plate. Thus, in use the mounting system clamps the front and rear edges of the base plate to a tracked floor.

Herein "tracked floor" may mean a rigid planar structure constructed from a plurality of plank modules. Each plank module may be mode from extruded metal (e.g. aluminium). Each plank module may extend in a longitudinal direction and may include one or more longitudinal tracks formed therein. Each track comprises a recessed channel that lies within the plank module and is open along a longitudinal aperture in the top surface of the plank module. Each channel is arranged to receive one or more bolt retainers. The bolt retainer can slide within the channel into a desired position, in which they can be secured, e.g. by inserting a blocking element or the like, in a conventional manner. The tracked floor can be a modular construction in which a plurality of plank module is clipped or otherwise secured along abutting side edges. The tracked floor can be secured to a vehicle chassis in any conventional manner.

The word "lateral" is used herein to indicate a direction that extends transverse to the direction of the tracks in the tracked floor. In a vehicle, the tracks in a tracked floor typically extend in the direction of motion of the vehicle, which is also referred to herein in as the longitudinal direction. Accordingly, the "lateral" direction may also be understood as extending transverse to the direction of motion of a vehicle in which the mounting system is used.

The term "clamping beam" is used to indicate that the mounting system operates to press the base plate of the access device against the tracked floor along its front and rear edges. Securing the base plate in these regions prevents the base plate from rocking forwards and backwards relative to the tracked floor during vehicle motion and during operation of the access device.

The term "access device" is used herein to mean any device capable of lifting or conveying a wheelchair to an elevated position. The access device may be a conventional wheelchair elevator, e.g. comprising a horizontal platform that is movable by a hydraulic lift. The hydraulic lift may be mounted on the base plate that is secured by the mounting system of the invention. The horizontal platform may be liftable to a position that is in line (vertically matched) with the base plate. The platform may be attached to the base plate via a bracket comprising a pair of upstanding side arms. Access to the vehicle from the platform may be through a passage between the side arms over the base plate. The access device may alternatively be a fold-out ramp, e.g. tailboard ramp. The ramp may have one, two or three parts that are pivot relative to each other to allow the ramp to transition from a folded configuration in which the parts are stowed vertically adjacent one another within the vehicle (e.g. above the base plate) to a deployed configuration in which the parts lie flat in sequence to form a pathway from the ground into the vehicle.

Each of the plurality of lateral clamping beams may include a plurality of attachment regions for aligning with the plurality of tracks, wherein each of the plurality of attachment regions is securable with a respective track. The plurality of attachment regions may each comprise a through hole (e.g. bolt hole) for receiving a bolt.

Securing an object to a tracked floor typically involves: (i) positioning one or more bolt retainers within channels of respective tracks in the tracked floor; (ii) aligning bolt holes in one or more objects to be secured over the aperture of the tracks to lie over the bolt retainer; (iii) securing the object to the bolt retainer. Each bolt retainer may be an elongate body that slides in channel. The bolt retainer may include one or more upstanding bolt shafts to which the object can be secured. Alternatively or additionally, each bolt retainer may include one or more upward facing apertures to receive a bolt shaft (e.g. a T-bolt shaft or the like. For example, a bolt can be inserted in a first (insertion) orientation in which a bolt head profile is shaped to fit through the bolt hole, opening, and aperture. The bolt can be secured within the bolt retained by rotating it to second (secured) orientation so that bolt head turns in bolt retainer to a position where it cannot be withdrawn (i.e. its profile is wider than the aperture). The object can then be secured to the bolt using a nut or other suitable attachment component.

In the invention, the bolts may pass only through components of the mounting system, e.g., the lateral clamping beams. The bolts need not pass through the base plate of the access device. This means that the access device does not need to have any bolt holes formed in its base. Accordingly, a step of specially adapting the base plate for mounting in a given vehicle is avoided.

Each of the plurality of attachment regions may comprise a collar receivable within the through hole, wherein the collar includes a bore dimensioned to receive a shaft of the bolt, and wherein the through hole has a lateral width greater than a width of the bore.

The configuration of bolt holes in the components of the mounting system may permit mounting on different tracked floor configurations. The tracked floor configurations may differ in terms of spacing of neighbouring tracks, or in the size and shape of the track itself, e.g. the size and shape of openings in the channel that provide access to the bolt retainers. The mounting system may provide a plurality of bolt holes that allow for different track spacing. Alternatively or additionally, the bolt holes may be dimensioned to cover a plurality of possible track positions. In this example, the collar may be arranged to fit (snugly) in the bolt hole, where the collar include a through hole that aligns with one of the possible track positions. The collar is retained in the bolt hole and hence prevents relative movement between the bolt and the mounting system (e.g. lateral clamping beam).

Either or both of the front lateral clamping beam and the rear lateral clamping beam may have an inclined flange arranged to slope downwards over the respective edge of the base plate. This can ensure that the passage over the base plate is smooth, to avoid bumps or edges that may present a trip hazard.

As explained above, the lateral clamping beams may serve to ensure that the base plate is securely fixed against motion in a forward/backwards direction. The mounting system may also be configured to resist side-to-side motion of the base plate relative to the tracked floor. For example, the mounting system may further comprise a side plate configured for attachment to the tracked floor in a position in which it extends between the front lateral clamping beam and rear lateral clamping beam adjacent a side edge of the base plate. The side edge may thus present a physical barrier that prevents sideways (lateral) movement of the base plate.

The term "side plate" is used herein to mean any suitable rigid element for extending along a side edge of the base plate. The side plate may have a flat profile, e.g. to operate as a cover that lies over (and hides) the tracked floor at a side of the base plate.

Preferably there is a side plate secured on both sides of the base plate. The mounting system may thus define a frame that surrounds the base plate. The frame may be modular, whereby the clamping beams and side plates are separate elements. However, in other examples, the clamping beams and side plates may be integrally formed, e.g. as a whole frame, or as L-shaped or U-shaped elements for surrounding more than one edge of the base plate.

The side plate may include a pair of laterally extending arms for lying across the tracked floor. Each of the laterally extending arms may include a plurality of attachment regions. Similar to the lateral clamping beams, each of the plurality of attachment regions may be securable within a respective track. The side plate may thus be secured to the tracked floor in a similar manner to the lateral clamping beams.

The pair of laterally extending arms may comprise a front laterally extending arm that overlies the front lateral clamping beam, and a rear laterally extending arm that overlies the rear lateral clamping beam. In other arrangements the lateral clamping beams may overlie portions of the side plate. The order in which the elements of the mounting system are secured need not be essential to the invention.

Advantageously, the side plate and clamping beams may be secured to the tracked floor by the same attachment elements (e.g. bolts). For example, a first set of common attachment elements may be arranged to secure both the front laterally extending arm and the front lateral clamping beam to the tracked floor. A second set of common attachment elements may be arranged to secure both the rear laterally extending arm and the rear lateral clamping beam to the tracked floor.

The lateral clamping beams may have one or more attachment regions that do not overlap with the laterally extending arms of the side plate. The lateral clamping beams may be secured to the tracked floor using these attachment regions before the side plate is mounted. This may avoid the clamping beams shifting position while the side plate is secured.

The mounting system may further comprise a tab extending laterally from the side plate to overlie a side edge of the base plate. For example, the base plate may include one or more transverse ridges separated by a recessed region that abuts the tracked floor. The tab may protrude from the side plate to lie over a portion of the recessed region. The tab may be part of the side plate, or may be a separate element, e.g. extending from a body that is secured to an underside of the side plate.

In one example, the front lateral clamping beam may be joined to the rear lateral clamping beam by a longitudinal connecting element, such as a flange, beam or rod. The side plate may be securable to the longitudinal connecting element. For example, the side plate may include a longitudinally extending structure (e.g. flange) for abutting, engaging or otherwise coupling with the longitudinal flange. The mutually engaging structure may each include through holes that align to provide passageways for receiving fixing means, such as bolts or screws.

One or both of the front and rear lateral clamping beams may include a shaped portion adapted to fit around a component of or on the base plate. The shaped portion may abut the component to provide additional support against movement in the longitudinal direction relative to the tracked floor.

The mounting system may comprise a kit of parts suitable for use with an already installed tracked floor, e.g. to enable an access device to be fitted (or retrofitted) to a vehicle that already has a tracked floor.

In another example, the mounting system may be supplied with the tracked floor. Thus, the mounting system may include a tracked floor adapted to be secured to the chassis of a vehicle, wherein the tracked floor comprises a plurality of longitudinally extending tracks, wherein each track defines a recessed channel for holding a bolt retainer, and wherein the plurality of lateral clamping beams is configured to be bolted to a plurality of bolt retainers held within the plurality of longitudinally extending tracks.

In another aspect, there is provided a vehicle comprising: a chassis; a tracked floor secured to the chassis; an access device having a base plate positioned on the tracked floor; and a mounting system as discussed above arranged to secure the base plate to the tracked floor.

BRIEF DESCRIPTION OF THE DRAWINGS

An embodiment of the invention is discussed in detail below with reference to the accompanying drawings, in which.

DETAILED DESCRIPTION; FURTHER OPTIONS AND PREFERENCES

Figure 1:
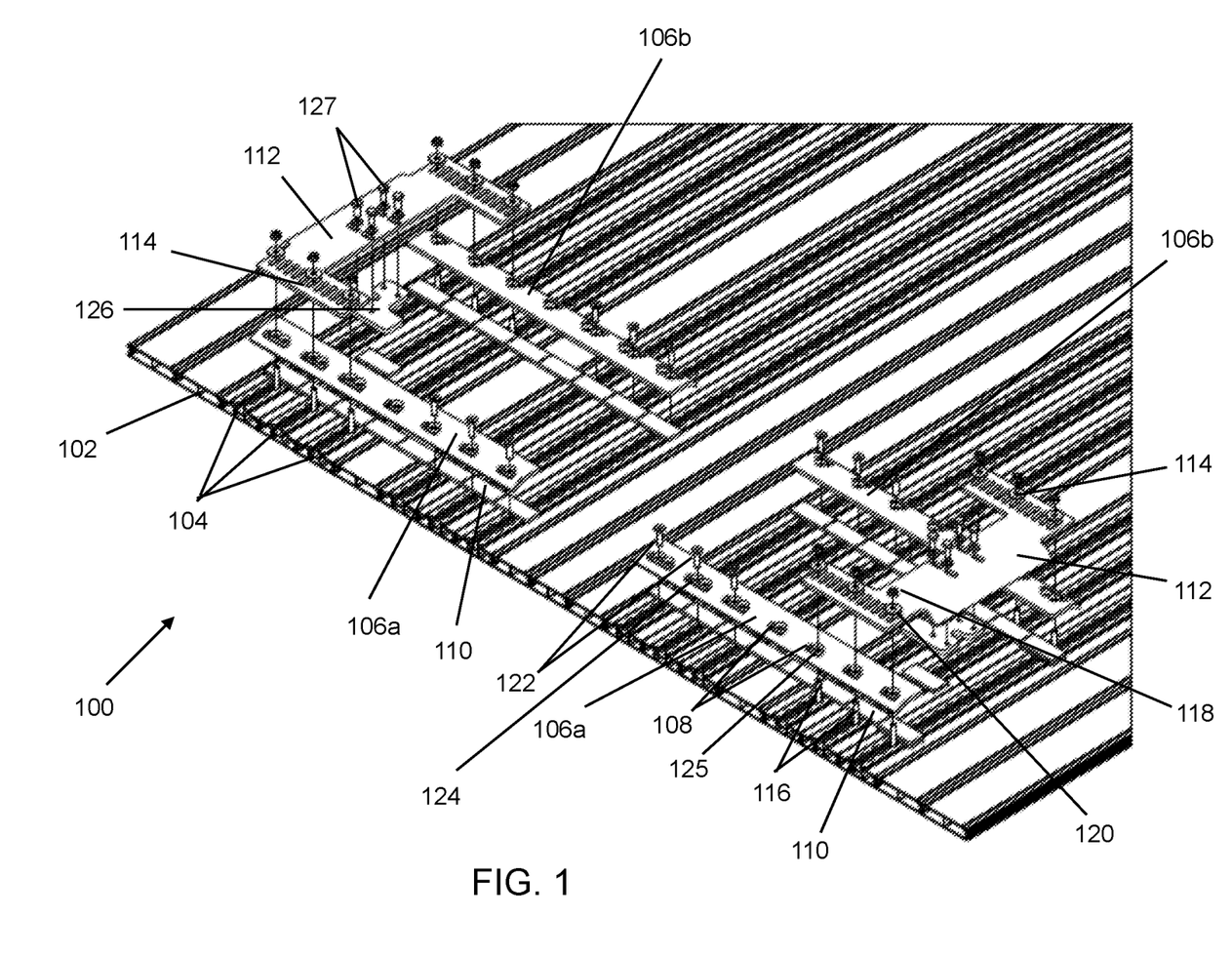
FIG. 1 is an exploded perspective view showing components of a mounting system that is an embodiment of the invention.

FIG. 1 is an exploded perspective view showing components of a mounting system 100 that is an embodiment of the invention. The mounting system 100 is arranged to secure an object, e.g. a rigid object such as a base plate for a wheelchair elevator to a tracked floor 102. The tracked floor 102 is a rigid construction that is secured to a vehicle chassis (not shown) in any conventional manner, e.g. by adhesive and physical bolts. The tracked floor 102 comprises a plurality of tracks 104 that run in a longitudinal direction which is typically aligned with the direction of travel of the vehicle. Each of the plurality of tracks 104 is a recessed channel in the tracked floor 102. Objects may be secured to the tracked floor 102 by being bolted to one or more bolt retainers (not shown) that are retained within the recessed channels. An example of a tracked floor which operates in this manner include Innotrax® manufactured by Braunability.

In this embodiment, the mounting system 100 comprises a plurality of components which are securable to the tracked floor 102 to clamp an object in place on the floor. This function obviates any need to directly attach the object to the tracked floor or any other part of the vehicle.

In the embodiments discussed herein, the object to be secure is a base plate for a wheelchair elevator. The description below thus refers to securing such a base plate. However, it is to be understood that the invention need not be limited to this particular use. The invention may be applicable to any access device having a base plate, e.g. a foldable ramp or the like.

The mounting system 100 comprises a set of lateral clamping beams 106a, 106b. In this example there are four clamping beams, which consist of a pair of front clamping beams 106a for overlaying a front edge of the base plate (not shown) and a pair of rear clamping beams 106b for overlaying a rear edge of the base plate. In this example, each clamping beam is arranged to extend laterally across a plurality of tracks in the tracked floor. Each clamping beam include a plurality of bolt holes 108 arranged to permit passage of a bolt shaft through the clamping beam into a respective track.

Each of the front clamping beams 106a has a forward facing downward sloping flange. Each of the rear clamping beams 106b has a rearward facing downward sloping flange. The flange ensures that the threshold between the vehicle floor and base plate is a smooth transition.

In use, the front edge and rear edge of the base plate are pressed against the tracked floor 102 by bolting the lateral clamping plates 106a, 106b to bolt retainers (not shown) that are held within tracks in the tracked floor 102. To assist in providing an even clamping force across the regions of the front edge and rear edge of the base plate that are contacted by the lateral clamping beams, the mounting system 100 may include a plurality of spacer elements 110. The spacer elements 110 are configured to lie above or adjacent the base plate to provide an even contact surface for the clamping beams at an optimum height.

The lateral clamping beams 106a, 106b function to secure the base plate to prevent relative movement between the base plate and tracked floor in a longitudinal direction, i.e. forwards and backwards with respect to the vehicle's direction of travel. The strength of the clamping may also be sufficient to prevent or inhibit lateral sliding of the base plate. The mounting system 100 may further comprise a pair of side plates 112 that are mounted at opposite side edges of the base plate. Each side plate 112 extends between respective front and rear clamping beams 106a, 106b. In this example, each side plate 112 includes a pair of laterally extending arms 114 that overlie a plurality of bolt holes on a respective clamping beam. The laterally extending arms 114 each include a plurality of through holes that arranged to permit passage of the bolt shaft therethrough. The side plate 112 may thus be secured using the same attachment component (e.g. nut and bolt combination) that is used to secure the corresponding clamping beam.

In the example shown in FIG. 1, each clamping beam 106a, 106b is secured using two types of bolt. A first type of bolt is used to secure the clamping beam 106a, 106b to one or more laterally outermost tracks, i.e. at tracks located towards the lateral sides of the floor. In FIG. 1 there are three closely spaced laterally outermost tracks.

A first type of bolt includes a body that is secured within a bolt retainer held within the channel defined by the track. An upright bolt shaft 116 protrudes from the body. The body may be an integral part of the bolt retainer. The bolt holes 108 in the clamping beam 106a, 106b and through holes in the laterally extending arms 114 of the side plates 112 are shaped to permit the bolt shaft to pass therethrough. A nut 118 or other suitable fixing component is attached, e.g. using cooperating threads, to the end of the bolt shaft to secure (and clamp together) the clamping beam and side plate. A washer 120 is disposed between the nut and side plate, as is conventional. One example of a bolt that can be used with the invention is described in EP 1 028 885.

A second type of bolt is used to attach the clamping beam to the tracked floor at location where the side plate is not present. In FIG. 1 this involves attaching the clamping beam to laterally innermost tracks. The second type of bolt 122 includes a bolt head having a bolt shaft extending therefrom. The bolt shaft is inserted through a bolt hole in the clamping beam into a bolt retainer (not shown) held within the channel of a respective track. Each bolt may be rotatable, e.g. through application of a suitable tool to the bolt head, to fix a distal end of the bolt shaft to the bolt retainer. Each bolt 122 has a top surface that is arranged to lie flush with or below a top surface of the lateral clamping beam 106a, 106b in which it is mounted. The ensures that the mounting system provides a smooth surface at the transition from the tracked floor to the base plate.

In one example, a countersunk bolt is used for both the first type and second type. The first type of bolt 116 is position with the countersunk head within the track, and is used with a plain washer and a nut to provide a strong connection. The second type of bolt 122 is placed with the countersunk head upwards, in order to provide an even surface at location where the wheelchair will pass over the mounting system.

Each bolt hole may have a width that is greater than the width of a track. This enables the clamping beams to be used with different tracked floor configurations. To prevent the bolt from moving within the bolt hole, a collar 124, 125 is provide for each bolt hole. The collar is shaped to fit within and be retained by the edge of the bolt hole. The collar 125 may include a single through hole that is configured to receive the bolt shaft. The bolt shaft may be secured within the through hole, e.g. by a threaded connection. The collar may be mounted in the bolt hole in an orientation in which its through hole overlies the track into which the bolt is to be connected. Alternatively or additionally, a single collar 124 may include a plurality of through holes, such that the same collar may provide a bolt-mounting locations at a plurality of positions to cater for different tracked floor configurations. In another example, a plurality of collars may be available, each one being adapted for a certain track position. A suitable collar is selected from the plurality of collars when assembling the mounting system.

To further assist in the securing the base plate, each side plate may include a laterally protruding tab that is arranged to overlie a side portion of the base plate. In the example shown in FIG. 1, laterally protruding tabs are provided on both sides of the base plate by respective L-shaped plates 126 that are attached by a set of bolts 127 to an underside of a respective side plate 112a, 112b. The L-shaped plates 126 assist in holding down the base plate.

FIGS. 2 to 6 show various stages in a method of mounting a wheelchair elevator in a vehicle using a mounting system that is an embodiment of the invention. In FIGS. 2 to 5, only a base plate 200 of the wheelchair elevator is depicted. However, it is to be understood that the mounting process can be performed on a fully assembled wheelchair elevator, i.e. with all the components shown in FIG. 6 already attached to the base plate 200. Although this example shows the mounting system in use with a wheelchair elevator, it is to be understood that the invention is applicable to any type of access device (e.g. load-bearing access device) that can be attached within a vehicle.

Figure 2:
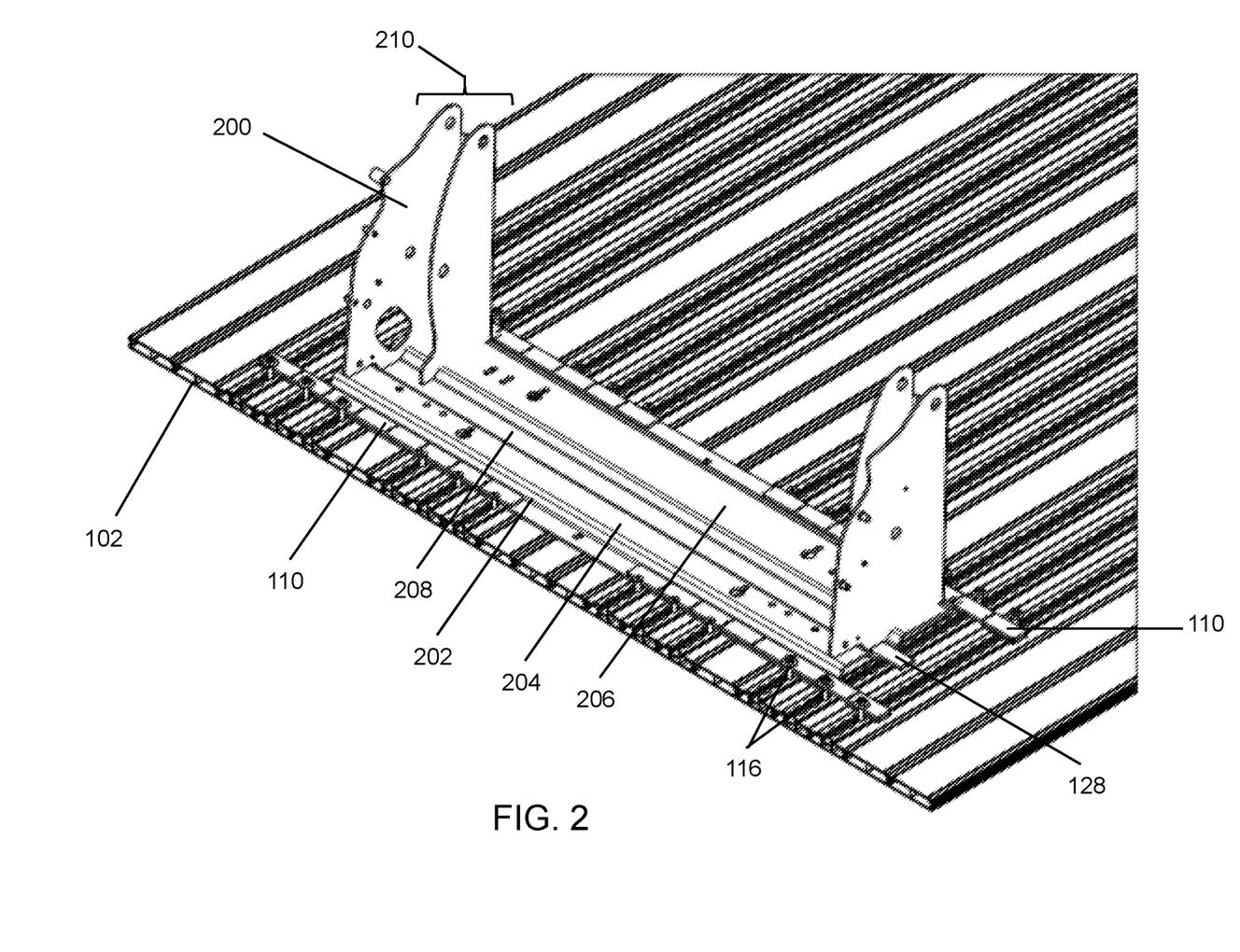
FIG. 2 is a perspective view of an elevator base plate positioned on structured floor before being attached by a mounting system of the invention.
Figure 6:
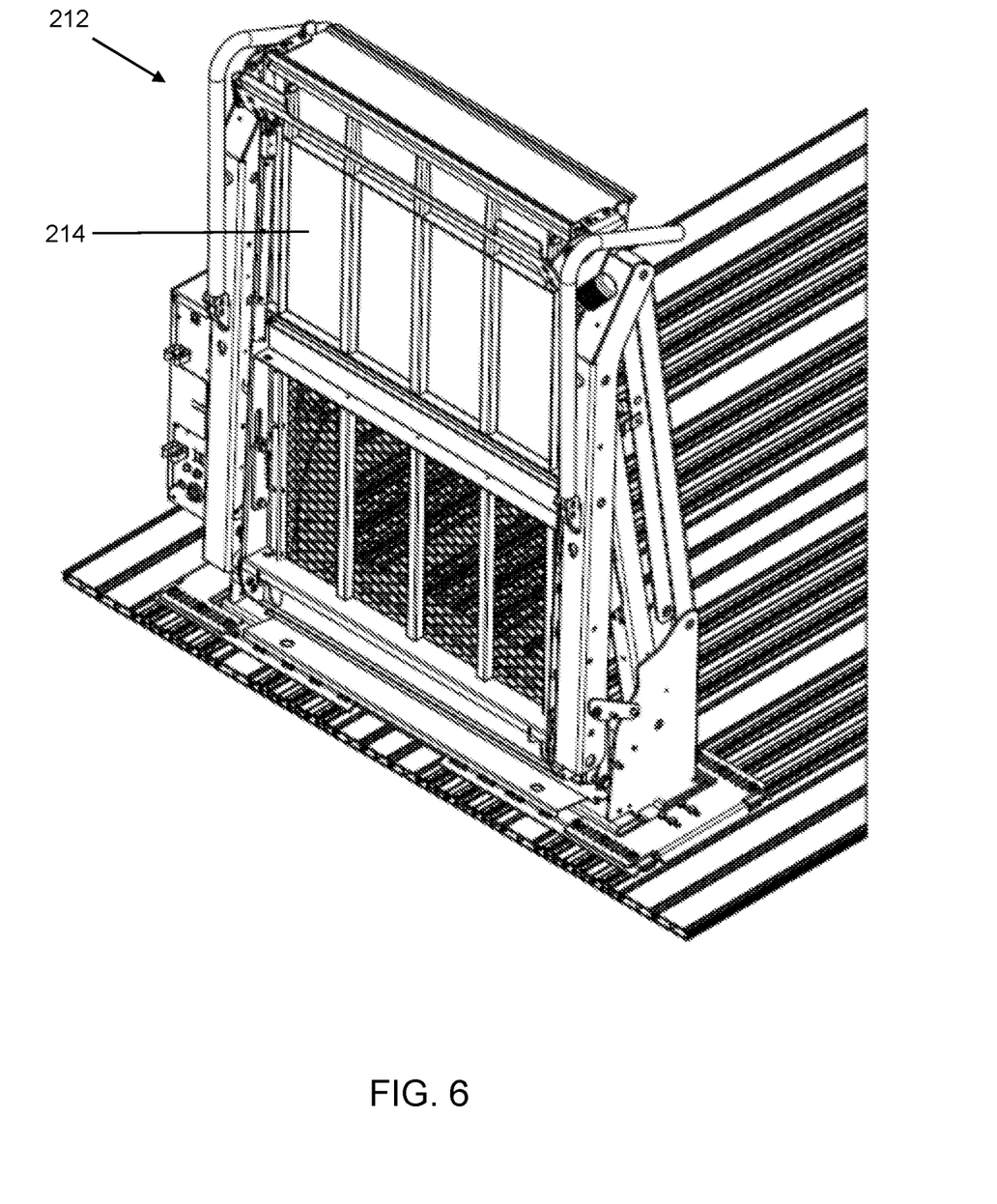
FIG. 6 is a perspective view of a wheelchair elevator secured to a structured floor by a mounting system that is an embodiment of the invention.

FIG. 2 is a perspective view of the base plate 200 positioned on the tracked floor 102 before being attached by the mounting system 100. The base plate 200 comprises a lateral strip portion 202 that lies across and in contact with the tracked floor. The lateral strip portion 202 is typically designed by the wheelchair elevator manufacturer for direct mounting on a particular vehicle chassis. In this example, the lateral strip portion 202 comprises an extruded metal plate having a forward raised rib 204 and a rearward raised rib 206. Between the raised rib is a lateral intermediate portion 208 that abuts the tracked floor 102. The lateral tabs discussed above are arranged to lie over the lateral edges of the intermediate portion, as discussed below. The base plate 200 further comprises two pairs of upstanding support flanges 210, each pair being located at respective lateral side of the strip portion 202. The support flanges 210 are arranged to hold one or more pivot arms of the wheelchair elevator's deployment mechanism (as shown in FIG. 6).

In FIG. 2 is can be seen that the base plate 200 is mounted on the tracked floor 102 in a manner whereby the front and rear edges of the lateral strip portion 202 receive the spacer elements 110 thereon, and the lateral intermediate portion 208 receives the side spacer element 128 thereon.

Figure 3:
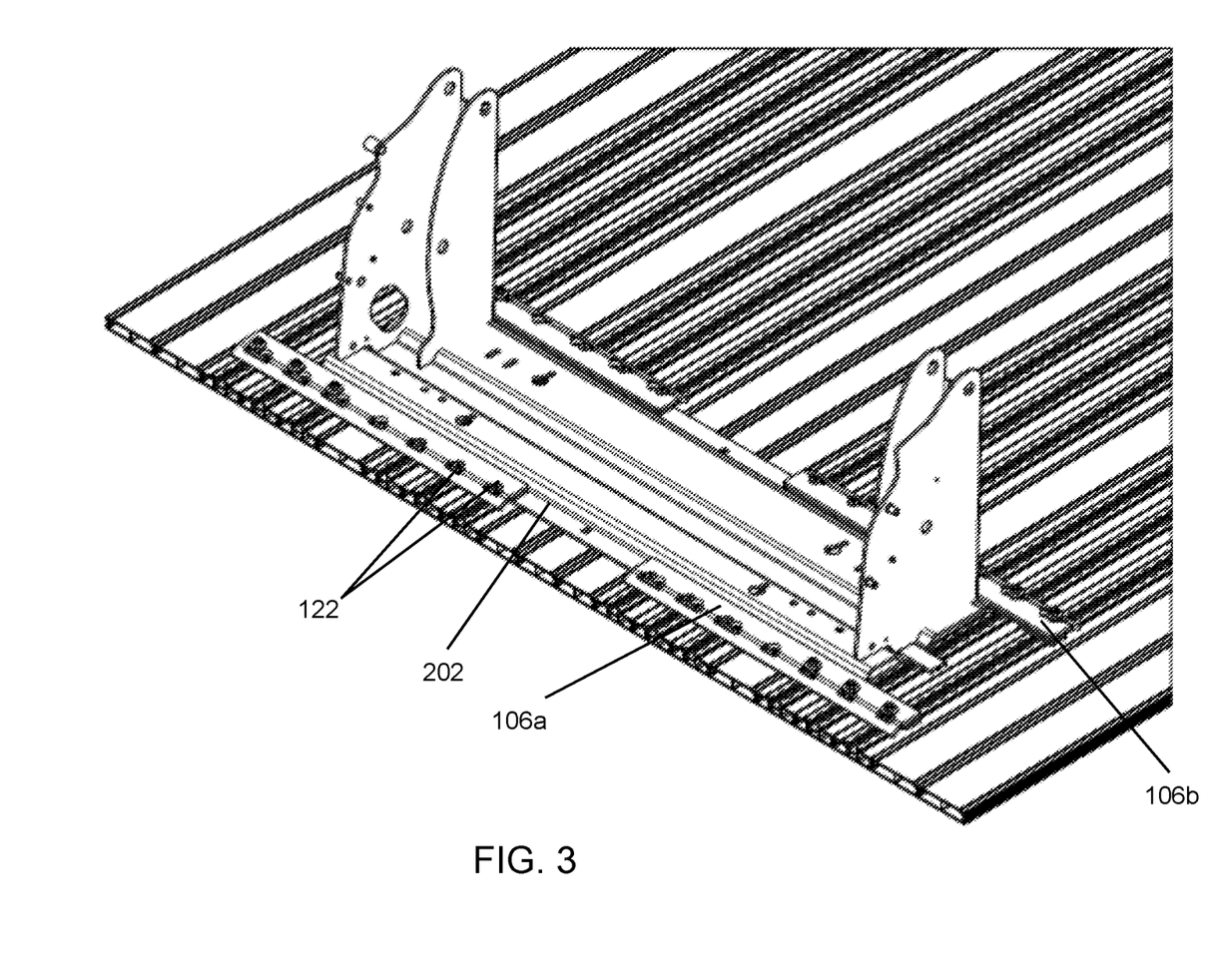
FIG. 3 is a perspective view of the elevator base plate of FIG. 2 in which a set of lateral clamping beams are mounted over the front and rear edges of the base plate.

FIG. 3 is a perspective view of the elevator base plate of FIG. 2 in which the lateral clamping beams 106a, 106b are mounted over the front and rear edges of the lateral strip portion 202. The inner bolts 122 may be attached at this point to hold the structure in place during the next steps in the assembly.

Figure 4:
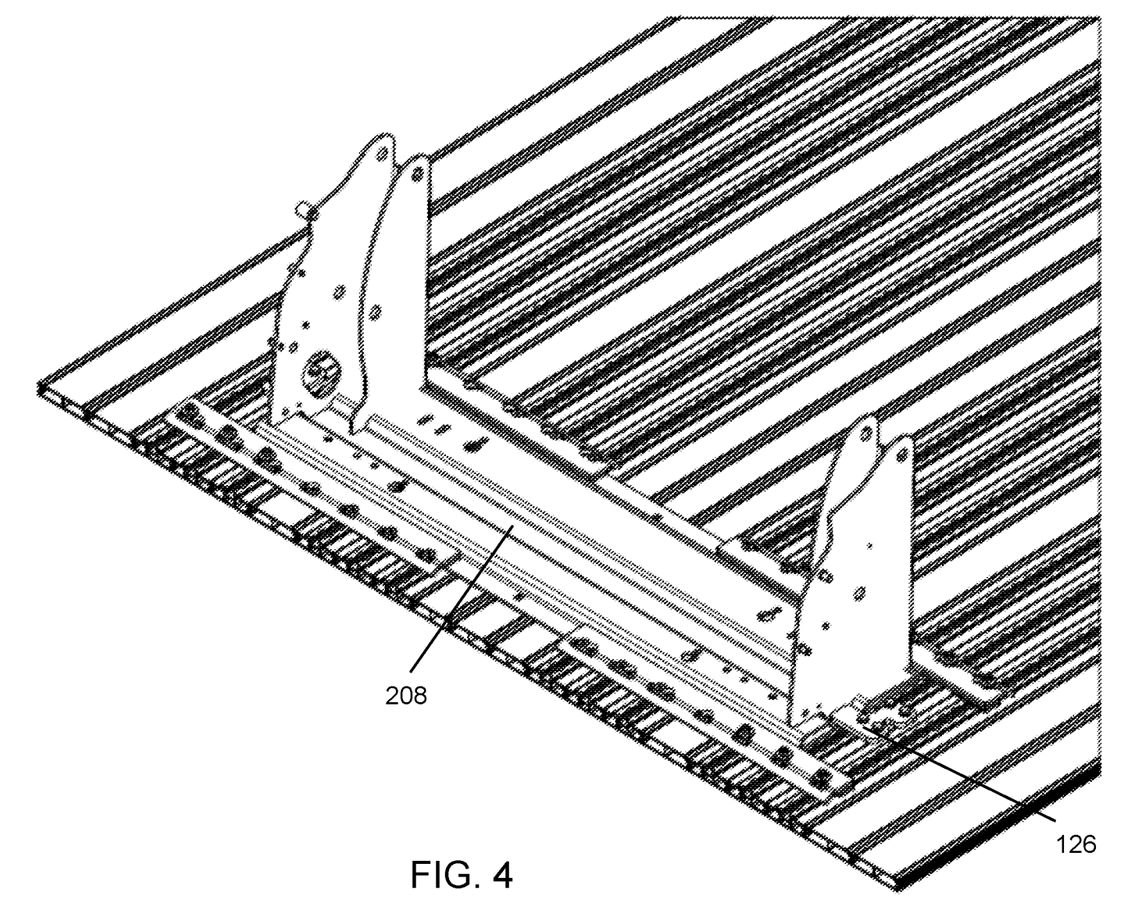
FIG. 4 is a perspective view of the elevator base plate of FIG. 3 in which an L-shaped securing tab is positioned at each side of the base plate.

FIG. 4 is a perspective view of the elevator base plate of FIG. 3 in which the L-shaped plates 126 are positioned at each side of the lateral strip portion 202 so that their tabs overlie a respective end of the lateral intermediate portion.

Figure 5:
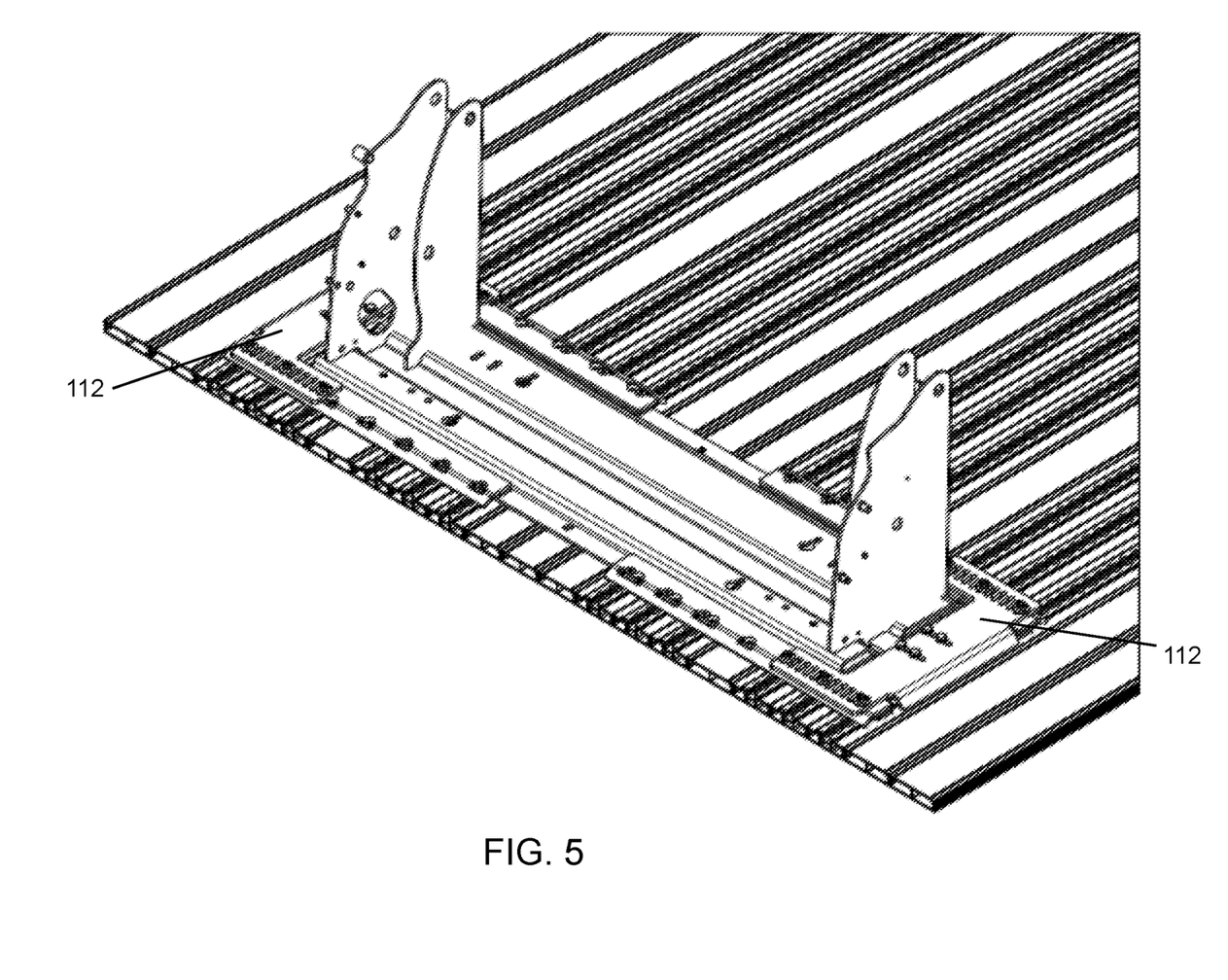
FIG. 5 is a perspective view of the elevator base plate of FIG. 4 in which a pair of side plates are mounted over each side of the base plate.

FIG. 5 is a perspective view of the elevator base plate of FIG. 4 in which the side plates 112 are mounted over each side of the base plate 200. The mounting system is secured in place by bolting the side plates 112 to the upstanding shafts 116 from the bolt retainers, and by securing the L-shaped plates 126 to their respective side plate 112.

FIG. 6 is a perspective view of a wheelchair elevator 212 secured to a tracked floor by a mounting system in the manner discussed with respect to FIGS. 1 to 5. The wheelchair elevator operates in a conventional manner, in which a flat (horizontal) platform is movable under the action of a hydraulic lift from a lower position (typically below the level of the tracked floor) to an upper position (typically level with the tracked floor). In FIG. 6, the wheelchair elevator is shown in a folded configuration, where the platform 214 is pivoted into an upright (e.g. vertical) orientation over the tracked floor, often within the vehicle.

Figure 7:
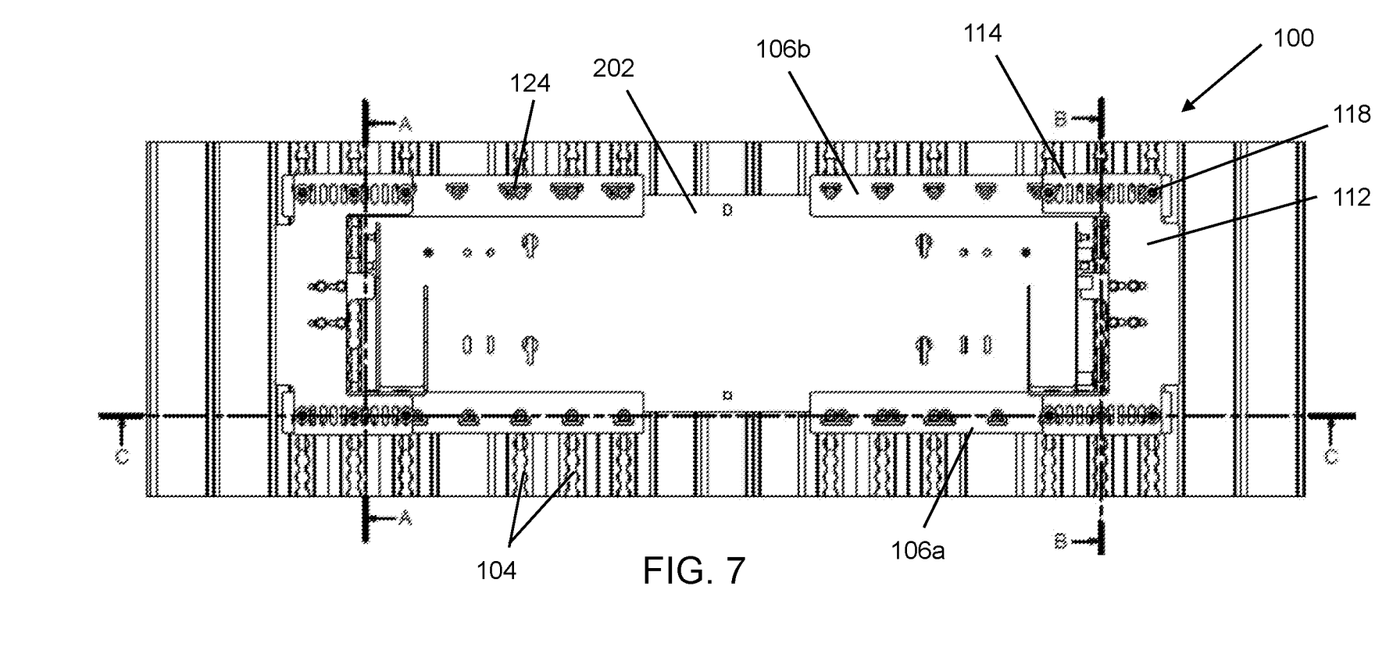
FIG. 7 is a plan view of a mounting system that is an embodiment of the invention.

FIG. 7 is a plan view of the mounting system 100 discussed above. Features in common with FIGS. 1 to 6 are given the same reference number and are not described again. FIG. 7 shows how each collar 124 includes a pair of through holes that permit the same lateral clamping beam 106a, 106b to be used for different spacings between tracks 104.

Figure 8:
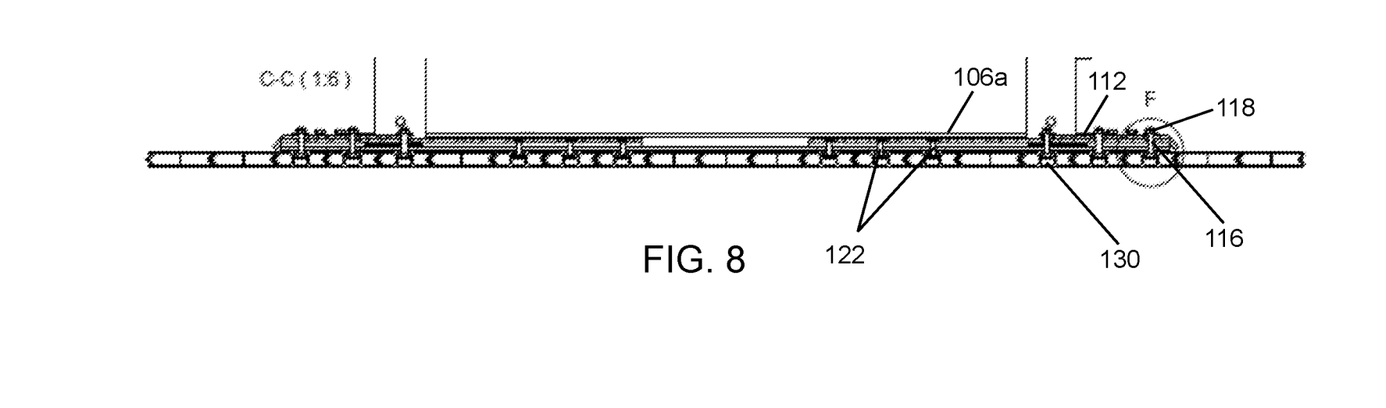
FIG. 8 is a lateral cross-sectional view through the mounting system of FIG. 7 along the line C-C.

FIG. 8 is a lateral cross-sectional view through the mounting system of FIG. 7 along the line C-C. In FIG. 8 it can be seen that the inner bolts 122 have top ends that lie flush with or below the top surface of the lateral clamping beam. In contrast, the outer bolts 116 protrude above a top surface of the side plate 112, where they are secured by a nut 118. The inner bolts 122 and outer bolts 116 are secured to respective bolt retainers 130 that are held within the channels of the tracked floor 104, as shown in more detail in FIG. 14.

Figure 9:
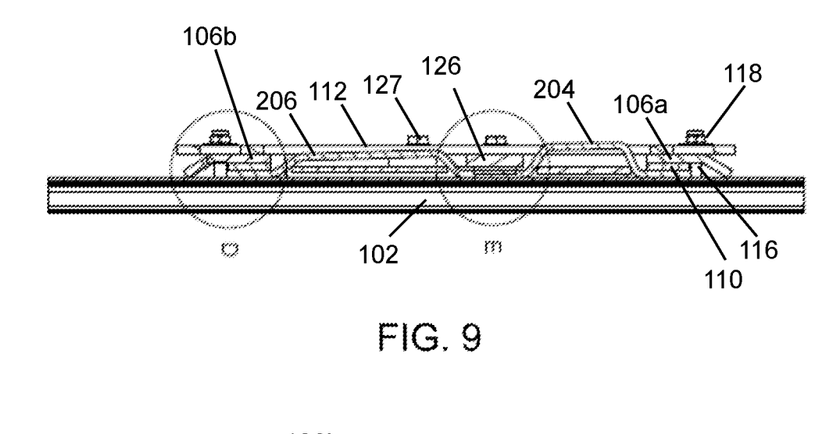
FIG. 9 is a longitudinal cross-sectional view through the mounting system of FIG. 7 along the line A-A.
Figure 10:
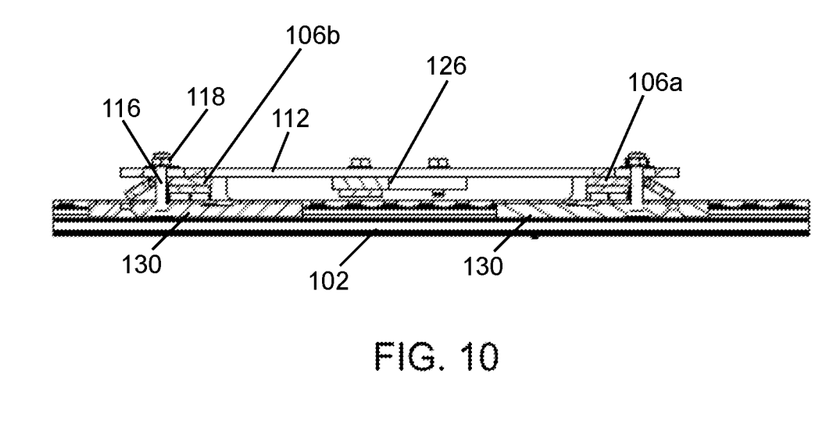
FIG. 10 is a longitudinal cross-sectional view through the mounting system of FIG. 7 along the line B-B.

FIGS. 9 and 10 cross-sectional side view showing how the clamp beams overlie the edges of the base plate (and if possible showing how the L-shaped tab sits in the recessed portion of the base plate. FIG. 9 is a longitudinal cross-sectional view through the mounting system of FIG. 7 along the line A-A. FIG. 10 is a longitudinal cross-sectional view through the mounting system of FIG. 7 along the line B-B. Features in common with FIGS. 1 to 6 are given the same reference number and are not described again.

Figure 11:
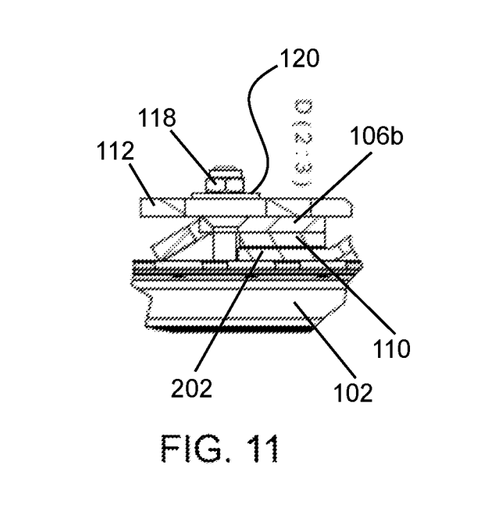
FIG. 11 is a close-up view of attachment region D in FIG. 9.
Figure 12:
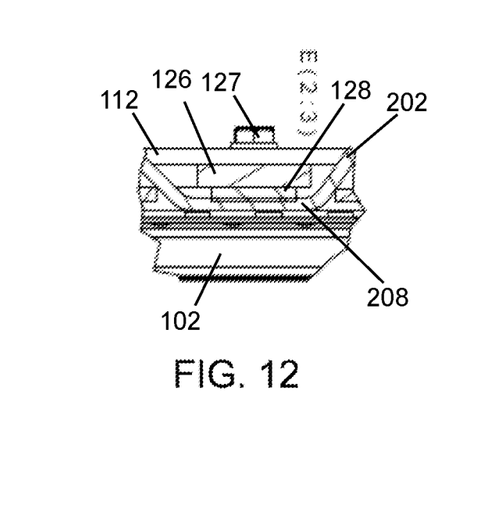
FIG. 12 is a close-up view of attachment region E in FIG. 9.
Figure 13:
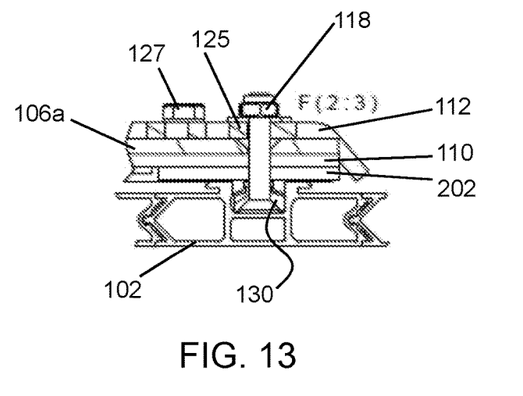
FIG. 13 is a close-up view of attachment region F in FIG. 8.

FIGS. 11 and 12 are close-up views of attachment regions D and E in FIG. 9. FIG. 13 is a close-up view of attachment region F in FIG. 8.

Figure 14:
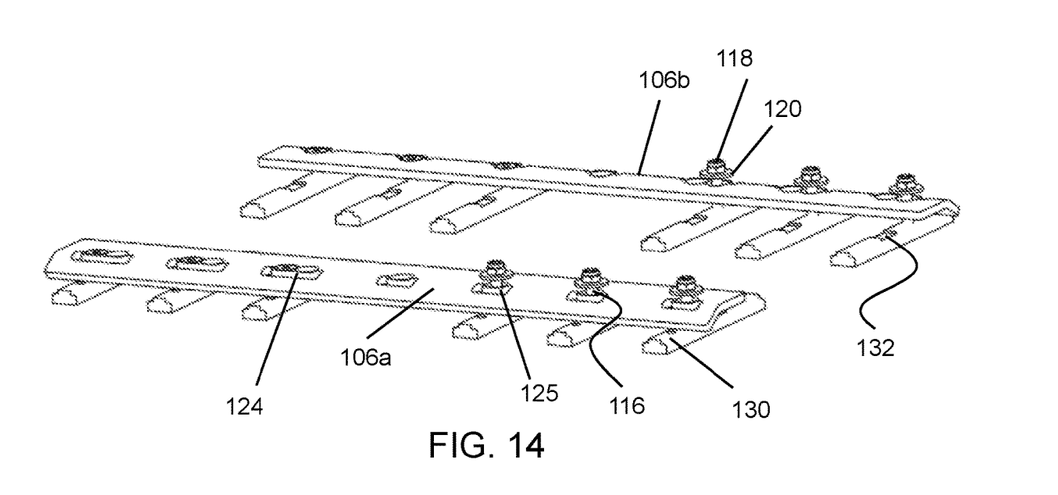
FIG. 14 is a perspective view showing a connection between lateral clamping beams and bolt retainers that are located in tracks in the structured floor.

FIG. 14 is a perspective view showing a connection between lateral clamping beams 106a, 106b and bolt retainers 130 that are located within the channels formed within the tracked floor 102. The tracked floor is omitted to show the bolt retainers 130 in more detail. Each bolt retainer 130 has an inverted T-shaped cross-section shaped to fit within a channel in the tracked floor. In this example, the bolt retainers have a notch 132 cut out of the top surface. The notch 132 is arranged to receive a key element (not shown) to secure the bolt retainer in the channel in a longitudinal sense. The key element may comprise a planar piece of rigid material (e.g. a metal disc or the like) that snugly fits in the notch 132. As shown in FIG. 7, each track 104 of the tracked floor 102 comprises a series of apertures (which may be joined to form a continuous longitudinal opening). Each aperture is shaped to retain the key element, thereby locking the bolt retainer within a track.

Figure 15:
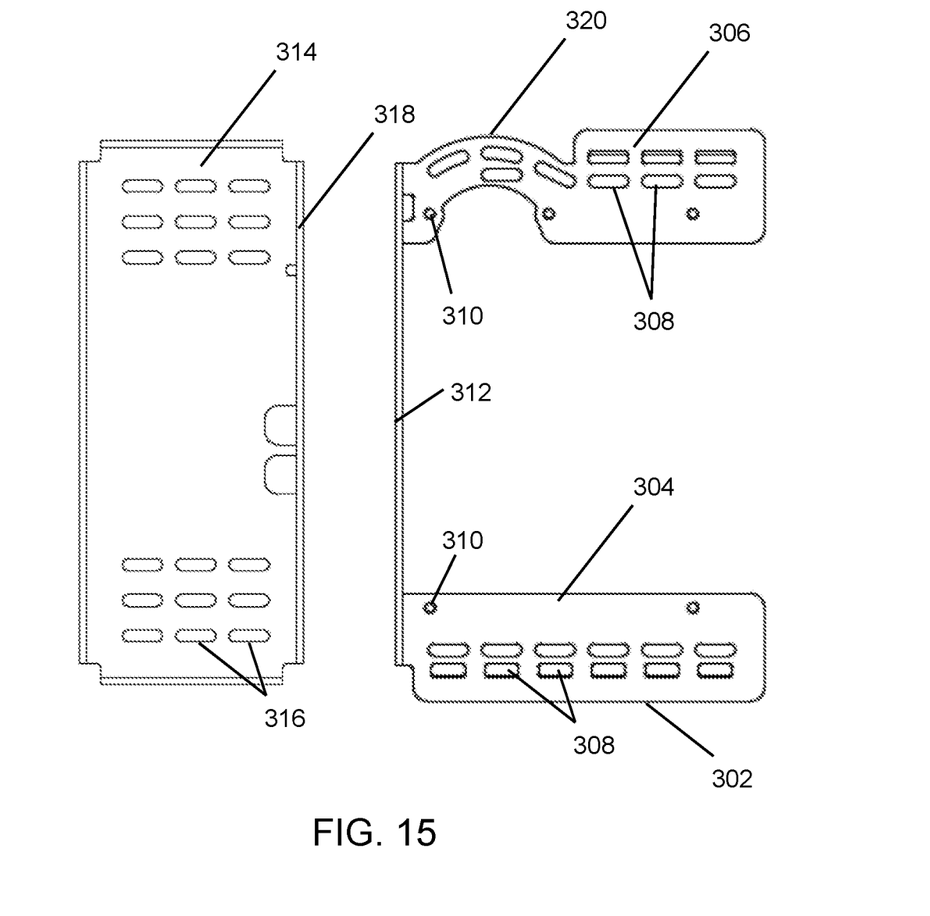
FIG. 15 is a plan view of an alternative configuration for a set of lateral clamping beams and side plate that can be used in a mounting system that is an embodiment of the invention.

FIG. 15 is a plan view of a different configuration for the lateral clamping beams and side plate that can be used in another embodiment of the invention.

In this embodiment, the mounting system comprises a first mounting element 302 that is configured for attachment to a tracked floor. The mounting element 302 comprises a front lateral clamping beam 304 and a rear lateral clamping beam 306. Similar to the lateral clamping beams discussed above, each of the front lateral clamping beam 304 and the rear lateral clamping beam 306 comprises a plurality of attachment regions 308 (e.g. through holes). The front lateral clamping beam 304 and the rear lateral clamping beam 306 have a lateral dimension (from left to right across the page in FIG. 15) selected such that they traverse a plurality of tracks on a tracked floor (not shown). This means that the attachment regions 308 are aligned with one or (preferably) more tracked in the tracked floor to permit attachment of the first mounting element 302 to the tracked floor. Sideways adjustment is therefore permitted through appropriate location of the clamping beams rather than sliding between the clamping beams and base plate.

The front lateral clamping beam 304 and the rear lateral clamping beam 306 are respective configured to overlie front and rear edges of a base plate (not shown) of a wheelchair elevator. The front lateral clamping beam 304 and the rear lateral clamping beam 306 each include one or more secondary attachment regions 310 for connecting the first mounting element 302 to the base plate. In this example, the secondary attachment regions 310 are bores for receiving bolts or screws. The bolts that pass through the secondary attachment regions 310 may also engage the base plate to prevent it from sliding out from between the front lateral clamping beam 304 and the rear lateral clamping beam 306.

Unlike the examples discussed above, where the front and rear lateral clamping beams were separate elements, in this example, the front lateral clamping beam 304 and the rear lateral clamping beam 306 are joined by a longitudinal flange 312, so that the first mounting element 302 is a single unit. The longitudinal flange 312 may have a length that is related to a known type of base plate with which the first mounting element 302 is to be used.

The longitudinal flange 312 is this example provides am attachment surface to which a side plate 314 can be secured. The side plate 314 comprises a corresponding longitudinal flange 318 along a side thereof that faces the first mounting element. The corresponding longitudinal flange 318 is arranged to abut or otherwise mate with the longitudinal flange 312 and be secured thereto by any suitable fixing means, e.g. bolts, screws or the like. The longitudinal flanges 312, 318 are upstanding strips, e.g. bent upwardly from the plane of the clamping beams 304, 306 or side plate 314 respectively. This arrangement may strengthen the overall structure.

The longitudinal flange 318 and the longitudinal flange 312 may have through holes formed therein which align to provide passageways for receiving the fixing means. The fixing means may be bolts or the like. These bolt may overlie a top surface of the base plate that lies between the front and rear lateral clamping beams, thereby operating to hold down the base plate.

The side plate 314 may have longitudinal flanges on both lateral sides thereof so that it can be used on both sides of a base plate.

The side plate 314 includes a plurality of attachments regions 316 (e.g. through holes) configured to permit attachment of the side plate 314 to the tracked floor in locations adjacent the first mounting portion 302. Similar to the embodiments discussed above, the side plate provided lateral support for the mounting system, e.g. to prevent sideways shifting thereof when in use.

In this example, the rear lateral clamping beam 306 includes a shaped portion 320 configured to fit around components of or on the base plate. For example, the shaped portion 320 illustrated in FIG. 15 has a curved (e.g. arc-like) shape when viewed from above. The shaped of the curve may be selected to fit around an upstanding bracket on the base plate. The shaped portion 320 may fit snugly against the bracket to provide additional support in the longitudinal direction.

The invention claimed is:

1. A mounting system for securing a base plate of an access device within a vehicle, the mounting system comprising:
    a plurality of lateral clamping beams configured for attachment to a tracked floor in an orientation in which each of the plurality of lateral clamping beams lies across a plurality of tracks in the tracked floor,
    wherein the plurality of lateral clamping beams comprises a front lateral clamping beam adapted to overlie a front edge of the base plate, and a rear lateral clamping beam adapted to overlie a rear edge of the base plate.

2. The mounting system of claim 1, wherein each of the plurality of lateral clamping beams includes a plurality of attachment regions for aligning with the plurality of tracks, wherein each of the plurality of attachment regions is securable with a respective track.

3. The mounting system of claim 2, wherein the plurality of attachment regions each comprises a through hole for receiving a bolt.

4. The mounting system of claim 3, wherein each of the plurality of attachment regions comprises a collar receivable within the through hole, wherein the collar includes a bore dimensioned to receive a shaft of the bolt, and wherein the through hole has a lateral width greater than a width of the bore.

5. The mounting system of claim 1, wherein the front lateral clamping beam has an inclined flange arranged to slope downwards over the front edge of the base plate.

6. The mounting system of claim 1, wherein the rear lateral clamping beam has an inclined flange arranged to slope downwards over the rear edge of the base plate.

7. The mounting system of claim 1, further comprising:
a side plate configured for attachment to the tracked floor in a position in which it extends between the front lateral clamping beam and rear lateral clamping beam adjacent a side edge of the base plate.

8. The mounting system of claim 7, wherein the side plate includes a pair of laterally extending arms for lying across the tracked floor, wherein each of the laterally extending arms includes a plurality of attachment regions, wherein each of the plurality of attachment regions is securable within a respective track.

9. The mounting system of claim 8, wherein the pair of laterally extending arms comprises a front laterally extending arm that overlies the front lateral clamping beam, and a rear laterally extending arm that overlies the rear lateral clamping beam.

10. The mounting system of claim 9 further comprising a first set of common attachment elements arranged to secure both the front laterally extending arm and the front lateral clamping beam to the tracked floor, and a second set of common attachment elements arranged to secure both the rear laterally extending arm and the rear lateral clamping beam to the tracked floor.

11. The mounting system of claim 7, further comprising a tab extending laterally from the side plate to overlie a side edge of the base plate.

12. The mounting system of claim 11, wherein the tab extends from a body that is secured to an underside of the side plate.

13. The mounting system of claim 7, wherein the front lateral clamping beam is joined to the rear lateral clamping beam by a longitudinal flange, and wherein the side plate is securable to the longitudinal flange.

14. The mounting system of claim 1, further comprising a tracked floor adapted to be secured to the chassis of a vehicle, wherein the tracked floor comprises a plurality of longitudinally extending tracks, wherein each track defines a recessed channel for holding a bolt retainer, and wherein the plurality of lateral clamping beams is bolted to a plurality of bolt retainers held within the plurality of longitudinally extending tracks.

15. A vehicle comprising:
a chassis;
a tracked floor secured to the chassis;
an access device having a base plate positioned on the tracked floor; and
a mounting system arranged to secure the base plate to the tracked floor, the mounting system comprising a plurality of lateral clamping beams configured for attachment to the tracked floor in an orientation in which each of the plurality of lateral clamping beams lies across a plurality of tracks in the tracked floor, wherein the plurality of lateral clamping beams comprises a front lateral clamping beam adapted to overlie a front edge of the base plate, and a rear lateral clamping beam adapted to overlie a rear edge of the base plate.

* * * * *